United States Patent
Yasui et al.

(10) Patent No.: US 7,418,329 B2
(45) Date of Patent: Aug. 26, 2008

(54) STEERING CONTROL APPARATUS FOR A VEHICLE

(75) Inventors: Yoshiyuki Yasui, Nagoya (JP); Hiroyuki Kodama, Kariya (JP); Kenji Asano, Toyota (JP); Toshihisa Kato, Handa (JP)

(73) Assignee: Advics Co., Ltd., Kariya, Aichi Pref. (JP)

( * ) Notice: Subject to any disclaimer, the term of this patent is extended or adjusted under 35 U.S.C. 154(b) by 0 days.

(21) Appl. No.: 11/760,117

(22) Filed: Jun. 8, 2007

(65) Prior Publication Data

US 2007/0294009 A1 Dec. 20, 2007

(30) Foreign Application Priority Data

Jun. 15, 2006 (JP) ............................. 2006-165668

(51) Int. Cl.
*G06F 7/00* (2006.01)

(52) U.S. Cl. ............................. 701/41; 701/71; 701/73

(58) Field of Classification Search ............ 701/41–43, 701/71–75, 48, 80; 180/410–415, 201, 197
See application file for complete search history.

(56) References Cited

U.S. PATENT DOCUMENTS 6,804,592 B2 * 10/2004 Klein et al. .................. 701/41
7,191,048 B2 * 3/2007 Aizawa et al. ............... 701/73
7,248,958 B2 * 7/2007 Watanabe et al. ............ 701/70
2005/0189163 A1 9/2005 Barton et al.

FOREIGN PATENT DOCUMENTS

| JP | 2676726 B2 | 5/1988 |
| JP | 3443951 | 2/1996 |
| JP | 2004-532153 A | 10/2004 |

* cited by examiner

*Primary Examiner*—Richard M. Camby
(74) *Attorney, Agent, or Firm*—Buchanan Ingersoll & Rooney PC

(57) ABSTRACT

A steering device is provided for controlling steering torque applied to a steering wheel of a vehicle. A braking device is provided for controlling longitudinal force applied to each wheel, and a control device is provided for performing at least one of an anti-skid control and a traction control. It is observed whether the control device is performing the control on a split road surface. The steering torque is controlled on the basis of a difference of longitudinal force applied to the right and left wheels, and a turning state amount deviation between a turning state amount and a desired amount thereof. The desired amount of turning state is calculated, on the basis of the turning state of the vehicle obtained when one of the anti-skid control and the traction control is performed on the split road surface.

8 Claims, 7 Drawing Sheets

STEERING CONTROL APPARATUS FOR A VEHICLE

This application claims priority under 35 U.S.C. Sec.119 to No. 2006-165668 filed in Japan on Jun. 15, 2006, the entire content of which is herein incorporated by reference.

BACKGROUND OF THE INVENTION

The present invention relates to a steering control apparatus for a vehicle, and particularly relates to a steering control apparatus capable of restraining deflection of the vehicle, when the vehicle is turning, with an anti-skid control or traction control being performed on a μ-split road surface.

In Japanese Patent Laid-open Publication No. 2004-532153, which corresponds to US Publication No. 20050189163A1, with respect to a stability compensation system for stabilizing a vehicle, it is proposed to provide the system which is capable of stabilizing the vehicle by adjusting a steering wheel, when a split μ (may be called as a μ-split) braking operation is performed to cause unbalanced braking torque, thereby to deteriorate the vehicle stability. It is described in the US Publication that there is provided a vehicle stability compensation system which is arranged to adjust dynamically the self-centering position and the steering feel of the steering system during split μ braking operation, the adjustment being based on at least one operational variable representing a corrective steer angle for the vehicle which is added to the main EAS assistance torque via a driver feedback controller whereby to maintain the vehicle stable and controllable.

Then, it is described that one possible operational variable representing a corrective steer angle is the braking yaw moment. This can be established, for example by generating and subtracting from each other, estimates of the brake pressures at the front left and front right wheels, multiplying the difference by a constant to give the difference in brake forces for the front wheels, and dividing the result by the track width of the vehicle. The braking yaw moment is multiplied by a gain to give the corrective steer angle. A second possible operational variable representing a corrective steer angle is yaw oscillation. This can be established, for example, by inverting a yaw rate signal, multiplying this by a gain and using the result as a feedback signal providing yaw oscillation correction. And, it is described that a vehicle model is driven by inputs of steering angle (at the road wheels), yaw moment disturbance input and vehicle speed.

Furthermore, Japanese Patent No. 2676726 discloses a pressure estimation in case of an anti-skid control, as will be described later, and Japanese Patent No. 3443951 discloses a pressure estimation in case of an traction control, as will be described later.

However, according to the invention as disclosed in Japanese Patent Laid-open Publication No. 2004-532153, it relates to the stability compensation system for stabilizing the vehicle, when the anti-skid control is performed on the so-called μ-split road surface, with different coefficients of friction being provided at the right and left front wheels, and the control prevails completely, as long as the vehicle driver is following the control. Then, it is so constituted that the corrective steer angle is obtained on the basis of a difference in braking pressure between the right and left front wheels, or an error between an estimated yaw rate (may be called as desired yaw rate) based on a vehicle speed and steering angle, and an actual yaw rate, and that an assist torque for an electric assist steering system (may be called as electric power steering system) is controlled on the basis of the corrective steer angle.

With respect to the electric power steering system, the steering wheel and steered wheels are mechanically connected with each other, to provide one to one relationship through a steering gear ratio. According to the system with the control prevailing completely as disclosed in the aforementioned Publication No. 2004-532153, it is possible to calculate the desired yaw rate based on the vehicle speed and steering angle, even in the case where the μ-split road surface exists in the turning course of the vehicle. However, according to such an assist system that the steering maneuver of the vehicle driver prevails, and that is aimed to assist the maneuver of the vehicle driver with the steering torque, it is difficult to be determined whether the steering angle of the steering wheel is resulted from the intention of the vehicle driver, i.e., the maneuver of the vehicle driver, or the one resulted from the control. Therefore, it may be caused that the desired yaw rate based on the vehicle speed and steering angle can not be determined.

SUMMARY OF THE INVENTION

Accordingly, it is an object of the present invention to provide a steering control apparatus for controlling deflection of a vehicle to ensure a stability thereof, when the vehicle is turning, with an anti-skid control or traction control being performed on a μ-split road surface, to cause a difference in longitudinal force between right and left wheels.

In accomplishing the above and other objects, a steering control apparatus is disposed in a vehicle which comprises a steering device for controlling steering torque applied to a steering wheel of the vehicle, a braking device for controlling longitudinal force applied to each wheel of the vehicle, individually, and a control device for performing at least one of an anti-skid control and a traction control by the braking device. The steering control apparatus comprises a longitudinal force difference calculation device for calculating a difference of the longitudinal force applied to right and left wheels of the vehicle in the lateral direction thereof, a turning state amount detection device for detecting a turning state amount of the vehicle, a desired state amount calculation device for calculating a desired amount of turning state of the vehicle, and a deviation calculation device for calculating a turning state amount deviation between the turning state amount detected by the turning state amount detection device and the desired amount of turning state calculated by the desired state amount calculation device. Then, the steering device controls the steering torque on the basis of the difference of the longitudinal force calculated by the longitudinal force difference calculation device, and the turning state amount deviation calculated by the deviation calculation device. The desired state amount calculation device observes whether the control device is performing the control on a split road surface with different coefficients of friction being provided at the right and left side of the vehicle, and the desired state amount calculation device calculates the desired amount of turning state, on the basis of the turning state of the vehicle obtained when one of the anti-skid control and the traction control is performed on the split road surface.

As for the turning state amount of the vehicle, a yaw rate of the vehicle or lateral acceleration may be used.

Preferably, the steering torque control device may further comprise a first desired value calculation device for calculating a first desired value for the steering torque on the basis of the difference of the longitudinal force calculated by the longitudinal force difference calculation device, and a second desired value calculation device for calculating a second desired value for the steering torque on the basis of the turning state amount deviation calculated by the deviation calculation device. Then, the steering device controls the steering torque on the basis of the first desired value and the second desired value.

The first desired value calculation device may provide a first limit for the first desired value, and the second desired value calculation device may provide a second limit for the second desired value. And, the second limit may be set to be smaller than the first limit.

Preferably, the first desired value and the second desired value are added to provide a sum thereof, and the steering device controls the steering torque on the basis of the sum of the first desired value and the second desired value.

Furthermore, a third limit may be provided for the sum of the first desired value and the second desired value.

BRIEF DESCRIPTION OF THE DRAWINGS

The above stated object and following description will become readily apparent with reference to the accompanying drawings, wherein like referenced numerals denote like elements, and in which.

DETAILED DESCRIPTION OF EMBODIMENTS

Figure 1:
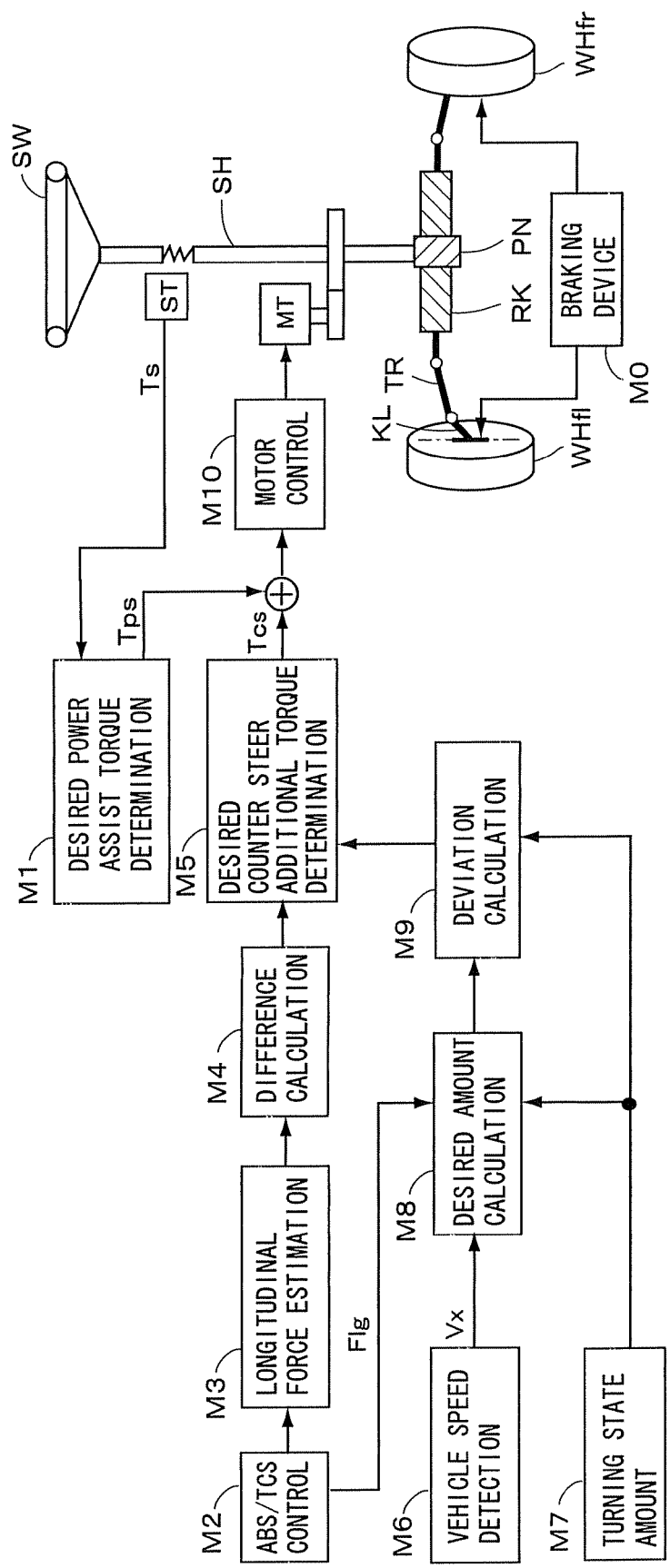
FIG. 1 is a schematic block diagram of a steering control apparatus according to an embodiment of the present invention.

Referring to FIG. 1, there is schematically illustrated a steering control apparatus, which may be called as an electric power steering control apparatus, according to an embodiment of the present invention. A steering wheel SW maneuvered by a vehicle driver is mechanically connected with steered wheels, generally front wheels, WHfr and WHfl as shown in FIG. 1. When the steering wheel SW is maneuvered, its rotational motion is transferred to a pinion gear PN through a steering shaft SH. Then, by means of a rack RK meshed with the pinion gear PN, the rotational motion of the latter is converted into a reciprocating motion of the former. In accordance with the motion of the rack RK, a knuckle arm KL is pushed through a tie rod TR, so that in accordance with the maneuver of the steering wheel SW, the steered wheels WHfr and WHfl are steered. The steering shaft SH is connected with an electric motor MT through a speed reducing mechanism (not shown). By means of the output of the electric motor MT, therefore, the force required for maneuvering the steering wheel SW by the vehicle driver is reduced, to achieve a so-called power steering control.

As shown in FIG. 1, a steering torque detection device ST is provided for detecting steering torque (Ts) applied to the steering wheel SW, and on the basis of the result detected by the steering torque detection device ST, calculated is a desired value (Tps) of power steering assist torque to reduce the force required for maneuvering the steering wheel SW by the vehicle driver, in a desired power steering assist torque determination device M1. In the vehicle as shown in FIG. 1, an ABS/TCS control device M2 is provided for performing at least one of an anti-skid control (ABS) and a traction control (TCS). In the present embodiment, wheel slip or spin will be prevented by means of a braking device M0, according to the conventional anti-skid control or traction control. And, in the case where the anti-skid control or traction control is performed on a road surface with different coefficients of friction being provided at the right and left wheels, i.e., so-called μ-split road surface, a control flag (Flg) indicative of performing the control is set to provide ON state.

In particular, in the turning operation of the vehicle, if the braking torque applied to each wheel is controlled on the μ-split road surface, according to the anti-skid control or traction control by means of the braking device, the braking force or driving force will be created, to be different at the right and left wheels. In this case, may be used a result detected by a hydraulic pressure sensor (indicated by PSxx in FIG. 2) disposed in each wheel. Or, even if the hydraulic pressure sensor is not provided, the braking torque can be calculated by known methods on the basis of actuating state of the braking device. With respect to estimation of the hydraulic pressure in case of the anti-skid control, it is disclosed in the aforementioned Japanese Patent No. 2676726, and estimation of the hydraulic pressure in case of the traction control is disclosed in the Japanese Patent No. 3443951. Furthermore, may be used a desired value of wheel cylinder pressure calculated in an electronic brake control unit (indicated by ECU2 in FIG. 2), as will be described later. The brake control device is not limited to the one for applying the braking torque by means of the hydraulic pressure as described above, but an electric brake device (not shown) may be employed. In the latter case, the object to be detected by the longitudinal force estimation device M3 will be the output or input of an electric motor for actuating the electric brake device, so that a desired value for controlling the electric motor may be used.

On the basis of the longitudinal force of the wheel calculated by the longitudinal force estimation device M3 as described above, a difference in longitudinal force between those applied to right and left wheels is calculated by a longitudinal force difference calculation device M4. Furthermore, the vehicle is provided with a vehicle speed detection device M6 for detecting a vehicle speed (Vx), and a turning state amount detection device M7 for detecting a turning state amount of the vehicle. The vehicle speed (Vx) can be calculated on the basis of the result detected by a wheel speed sensor (indicated by WSxx in FIG. 2) disposed on each wheel. As for the turning state amount, yaw rate (Yr) or lateral acceleration (Gy) will be provided for indicating the turning state of the vehicle.

In the ABS/TCS control device M2, on the basis of vehicle speed and turning state amount obtained when the anti-skid control or traction control is performed on the μ-split road surface, to set the control flag (Flg) to provide the ON state, a turning radius provided as a reference (hereinafter, referred to as reference radius)(Ro) is obtained. Since the vehicle speed and turning state can be always observed, the vehicle speed and turning state as described above include the specific vehicle speed and turning state obtained when the control flag (Flg) has become to provide the ON state, or the vehicle speed and turning state obtained immediately before that time, which can be obtained as a result of consecutive observation. Then, on the basis of the turning radius (Ro) and vehicle speed (Vx), a desired amount of turning state is calculated by a desired state amount calculation device M8. In this case, since a shape of a conventional road is formed in Clothoid curve, its curvature will not be changed rapidly. Therefore, according to the desired state amount calculation device M8 of the present embodiment, on the basis of the vehicle speed and turning state obtained when the control flag (Flg) has become to provide the ON state, or immediately before that time, the reference radius (Ro) of the road along which the vehicle is turning will be obtained, so that the desired amount of turning state will be calculated on the basis of the reference radius (Ro).

Furthermore, according to a deviation calculation device M9, calculated is a turning state amount deviation between the actual turning state amount detected by the turning state amount detection device M7 and the desired amount of turning state calculated by the desired state amount calculation device M8. On the basis of the difference of the longitudinal force calculated by the longitudinal force difference calculation device M4, and the turning state amount deviation calculated by the deviation calculation device M9, a desired value (Tcs) of counter steer additional torque is calculated by a desired counter steer additional torque determination device M5. And, the desired value (Tcs) of counter steer additional torque is added to the desired value (Tps) of power steering assist torque by the desired power steering assist torque determination device M1, to output a command value for actuating the electric motor MT, based on which the electric motor MT is controlled by the motor control device M10. Accordingly, those devices M1, M5 and M10, and electric motor MT or the like constitute the steering means of the present invention.

Figure 2:
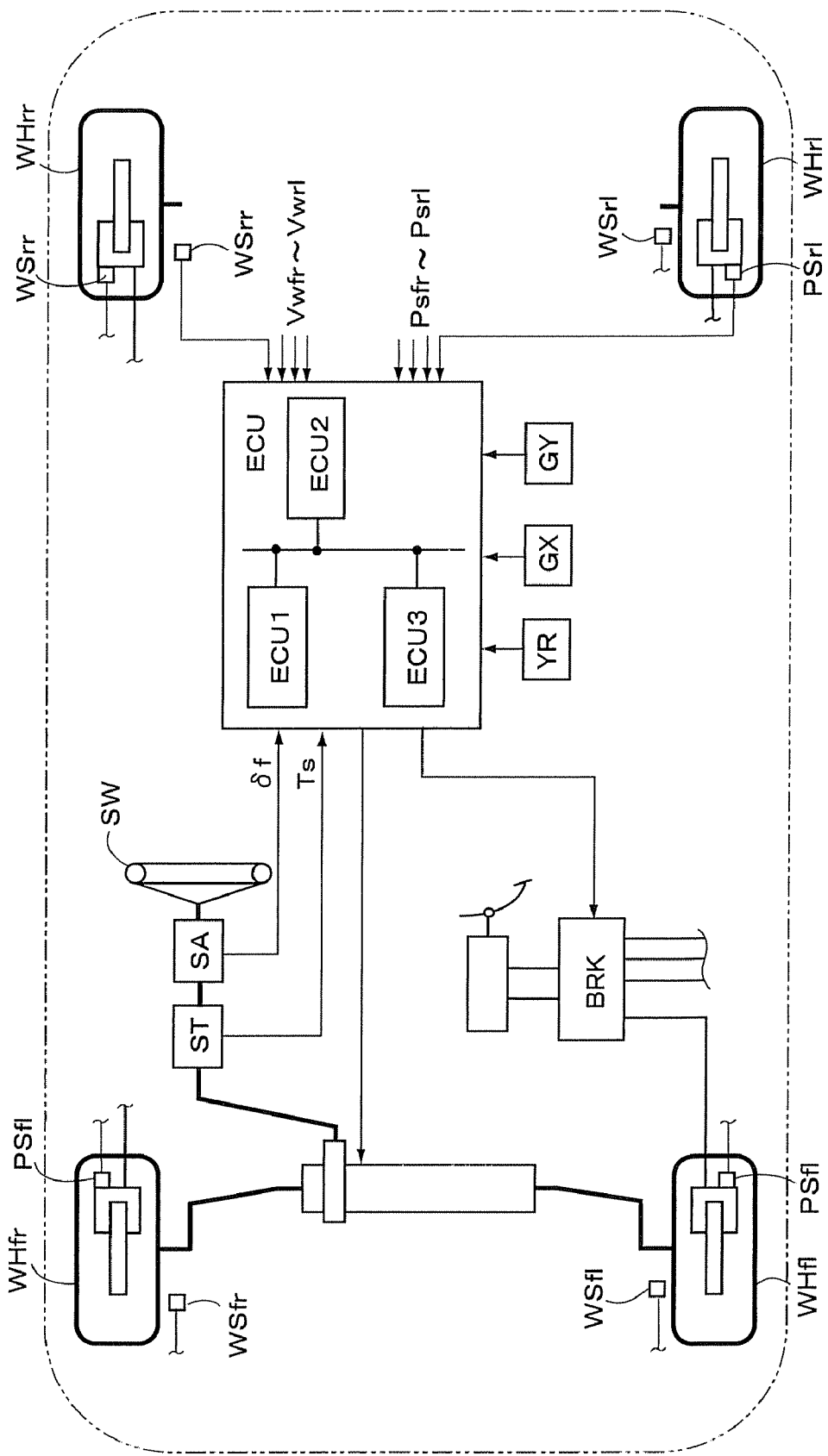
FIG. 2 is a schematic block diagram of a vehicle having a steering control apparatus according to an embodiment of the present invention.

The steering control apparatus is installed in the vehicle as shown in FIG. 2. On the wheels WSxx, wherein "xx" designates each wheel, i.e., "fr" designates the wheel at the front right side as viewed from the position of a driver's seat, "fl" designates the wheel at the front left side, "rr" designates the wheel at the rear right side, and "rl" designates the wheel at the rear left side, wheel speed sensors WSxx are disposed, respectively, which are connected to an electronic control unit ECU, and by which a signal having pulses proportional to a rotational speed of each wheel, i.e., a wheel speed signal is fed to the electronic control unit ECU. In addition, a steering angle sensor SA for detecting a steering angle (δf) of the steering wheel SW, steering torque sensor TS for detecting the steering torque (Ts), longitudinal acceleration sensor GX for detecting a vehicle longitudinal acceleration (Gx), lateral acceleration sensor GY for detecting a vehicle lateral acceleration (Gy), yaw rate sensor YR for detecting a yaw rate (Yr) of the vehicle, and the like are connected to the electronic control unit ECU. In the electronic control unit ECU, there are provided a steering control unit ECU1, brake control unit ECU2, throttle control unit ECU3 and the like, which are connected to a communication bus through a communication unit having CPU, ROM and RAM for use in communication. Therefore, the information for each control unit can be used commonly.

According to the steering control unit ECU1, the conventional power steering control is performed to reduce the maneuvering power of the steering wheel by the vehicle driver, on the basis of the steering torque (Ts) detected by the steering torque sensor ST. Furthermore, according to the steering control unit ECU1, the steering torque is applied to have the vehicle driver perform the counter steer appropriately, as will be described later. According to the brake control unit ECU2, on the basis of the detected result of the wheel speed sensor WSxx, the barking torque applied to each wheel is controlled by a braking control device BRK served as the braking device M0 as shown in FIG. 1, to perform the anti-skid control and traction control as done before. That is, according to the anti-skid control, if it is determined that the wheel tends to be locked, and it is likely to be locked, the braking torque applied to the wheel will be adjusted. And, according to the traction control, if it is determined that the wheel tends to spin, and it is likely to spin, the throttle will be actuated by the throttle control unit ECU3 in its closing direction to reduce the engine output, and the braking torque will be applied to the wheel which is likely to spin, thereby to restrain the wheel spin. On each wheel WHxx, a hydraulic pressure sensor PSxx is disposed, to control the braking torque accurately.

Figure 3:
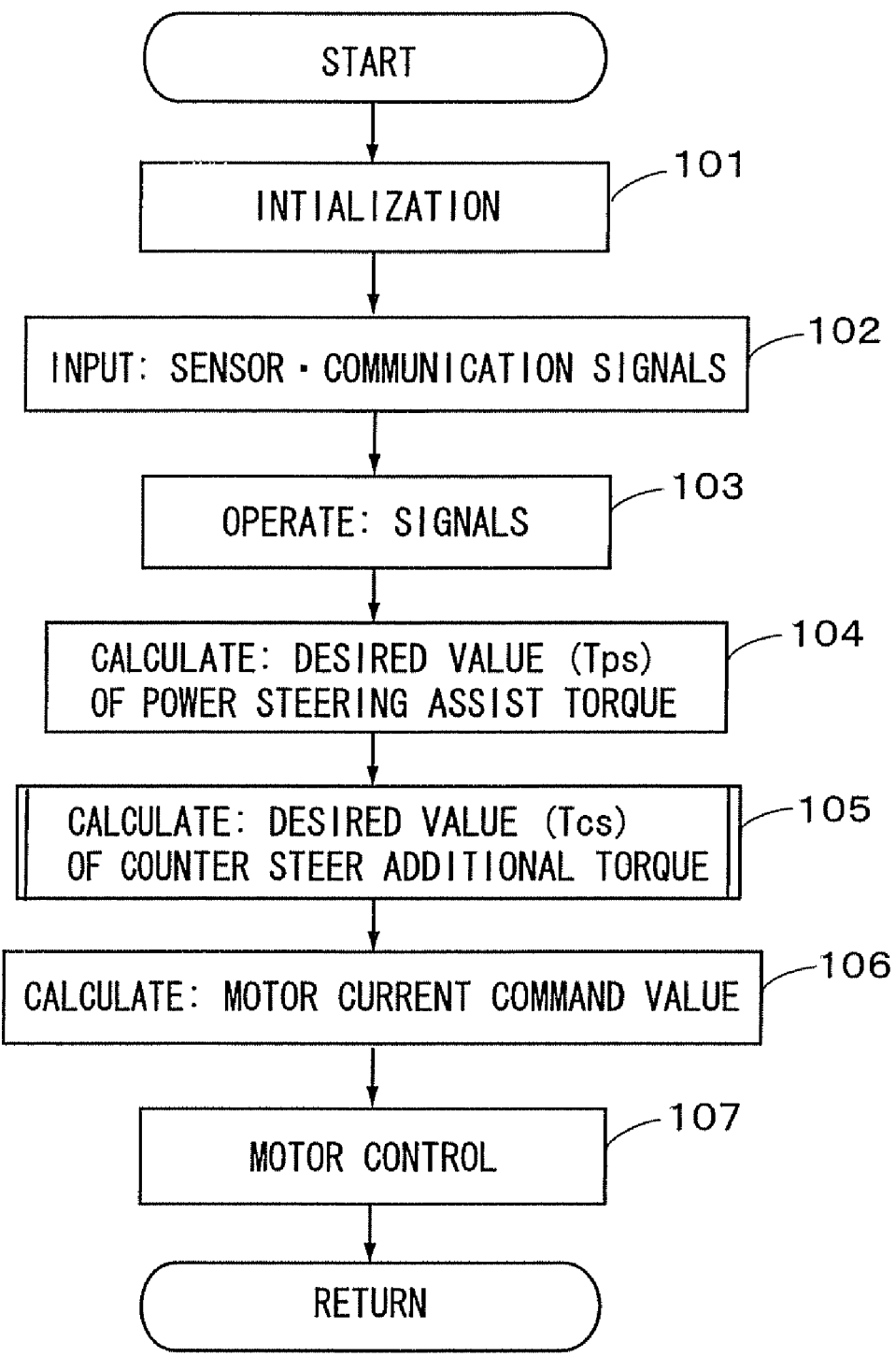
FIG. 3 is a flowchart of an example of steering control according to an embodiment of the present invention.

Next will be explained operation of the steering control apparatus as constituted above, referring to the flowchart as shown in FIG. 3. At the outset, the program provides for initialization of the system at Step 101, and the signals detected by various sensors and communication signals on the communication bus are read at Step 102. Then, the program proceeds to Step 103, where the signals are processed by filtering or the like. Next, at Step 104, the desired value (Tps) of the assist torque provided for the power steering control is calculated on the basis of steering torque (Ts). Then, the program proceeds to Step 105, where the desired value (Tcs) of counter steer additional torque is calculated for inducing the vehicle driver to perform the counter steer maneuver, as will be described later in detail, with reference to FIG. 4. The program further proceeds to Step 106, where the desired value (Tcs) of counter steer additional torque is added to the desired value (Tps) of power steering assist torque, so that a current command value to the electric motor MT is calculated on the basis of the added result (Tps+Tcs). Then, on the basis of the current command value, the electric motor MT is controlled at Step 107.

Figure 4:
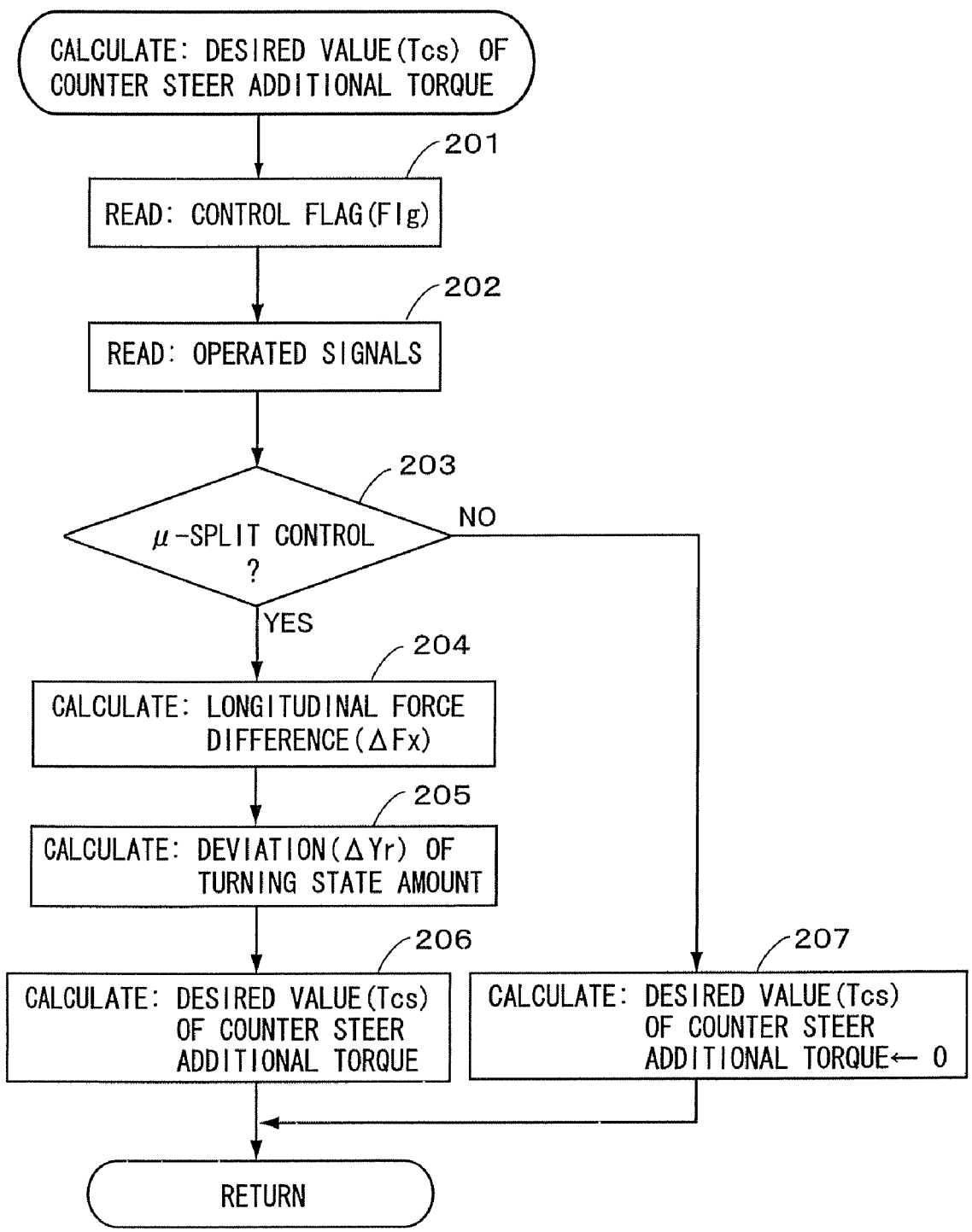
FIG. 4 is a flowchart of an example for calculating a desired value of counter steer additional torque according to an embodiment of the present invention.

The desired value (Tcs) of counter steer additional torque as described above is calculated according to the flowchart as shown in FIG. 4. At the outset, the control flag indicative of performing the anti-skid control or traction control is read at Step 201. This control flag includes the control flag (Flg) indicative of performing the anti-skid control or traction control on the μ-split road surface with different coefficients of friction being provided at the right and left wheels. And, the signals processed at Step 103 in FIG. 3 are read at Step 202. Then, on the basis of the read control flag, it is determined at Step 203, whether the anti-skid control or traction control on the μ-split road surface is being performed, i.e., under μ-split control, or not. If it is determined that the u-split control is not being performed, the program proceeds to Step 207, where the desired value (Tcs) of counter steer additional torque is set to be zero (0), so that the steering torque control for inducing the counter steer to assist it, hereinafter referred to as counter steer assist, will not be executed. Instead, if it is determined at Step 203 that the μ-split control is being performed, the program proceeds to Step 204, where the longitudinal force difference (ΔFX) of the wheel is calculated, and proceeds to Step 205, where the turning state amount deviation (yaw rate deviation ΔYr) is calculated. Then, at Step 206, the desired value (Tcs) of counter steer additional torque is calculated on the basis of the longitudinal force difference (ΔFX) and the turning state amount deviation (yaw rate deviation ΔYr).

As described above, the desired value (Tcs) of counter steer additional torque provided for the counter steer additional control is calculated on the basis of not only the longitudinal force difference between the right and left wheels, but also the turning state amount deviation. Therefore, deflection of the vehicle, which will be caused by the anti-skid control or traction control performed on the μ-split road surface, can be restrained effectively.

Figure 5:
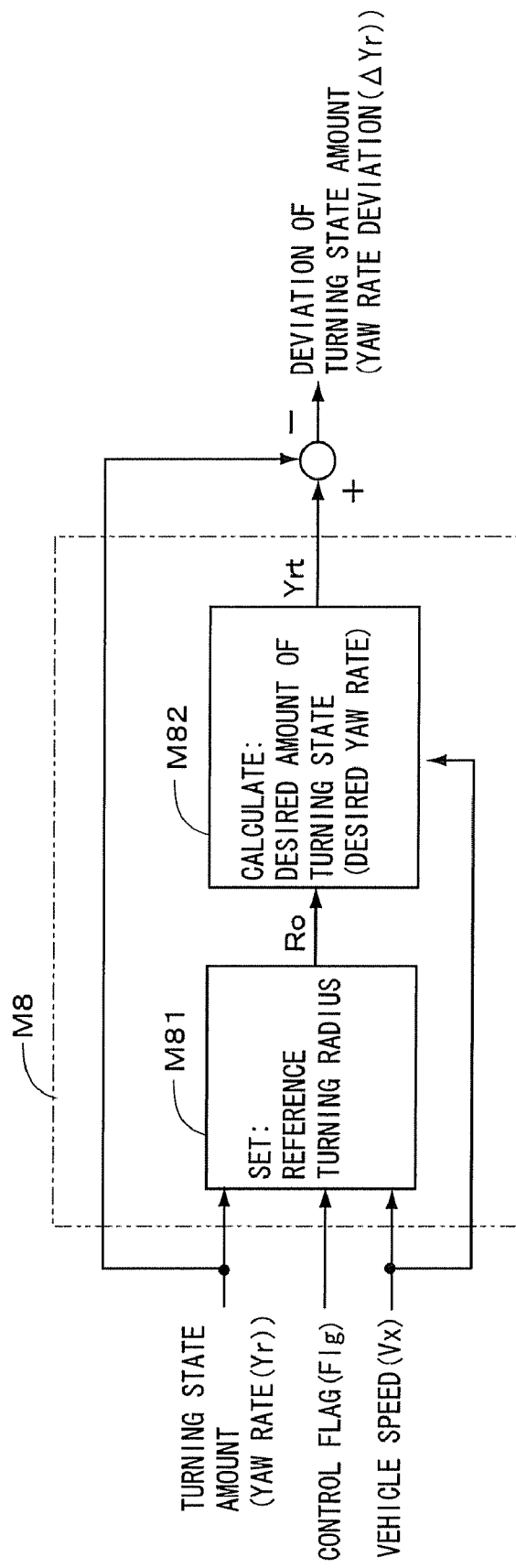
FIG. 5 is a block diagram of an example of a desired turning state amount calculation device, according to an embodiment of the present invention.

Next will be explained calculation of the desired amount of turning state made by the desired state amount calculation device M8 as shown in FIG. 1, with reference to FIG. 5. The turning state amount (yaw rate Yr), vehicle speed (Vx) and the control flag (Flg), which is set to provide the ON state when the anti-skid control or traction control is being performed on the μ-split road surface, are fed into the desired state amount calculation device M8. In the case where the yaw rate (Yr) is used as the turning state amount, on the basis of the vehicle speed (Vxo) and yaw rate (Yro) obtained when the control flag (Flg) has become to provide the ON state, or immediately before that time, the reference radius (Ro) is calculated by Ro=Vxo/Yro, at a reference radius setting device M81. And, on the basis of the reference radius (Ro) and vehicle speed (Vx), the desired amount of turning state is calculated at a desired state amount calculation device M82. That is, as for the desired amount of turning state, the desired yaw rate (Yrt) is calculated by Yrt=Vx/Ro.

Since the shape of the road is formed in Clothoid curve, and its curvature will not be changed rapidly, as described before, on the basis of the vehicle speed and turning state amount obtained in the case where the control flag (Flg) is set to provide the ON state, when the anti-skid control or traction control is performed on the μ-split road surface, the reference radius (Ro) of the road along which the vehicle is turning, can be obtained, whereby the desired amount of turning state can be obtained on the basis of the reference radius (Ro). In the case where the vehicle is traveling straight, however, the reference radius (Ro) obtained when the control flag (Flg) has become to provide the ON state, or immediately before that time, will become infinite ($\infty$), so that the desired amount of turning state (desired yaw rate) will be zero. Then, the actual turning state amount detected by the vehicle turning state amount detection device M7 is compared with the desired amount of turning state calculated by the desired state amount calculation device M8, so that the deviation between them is calculated by the deviation calculation device M9, to provide the yaw rate deviation ($\Delta$Yr).

Figure 6:
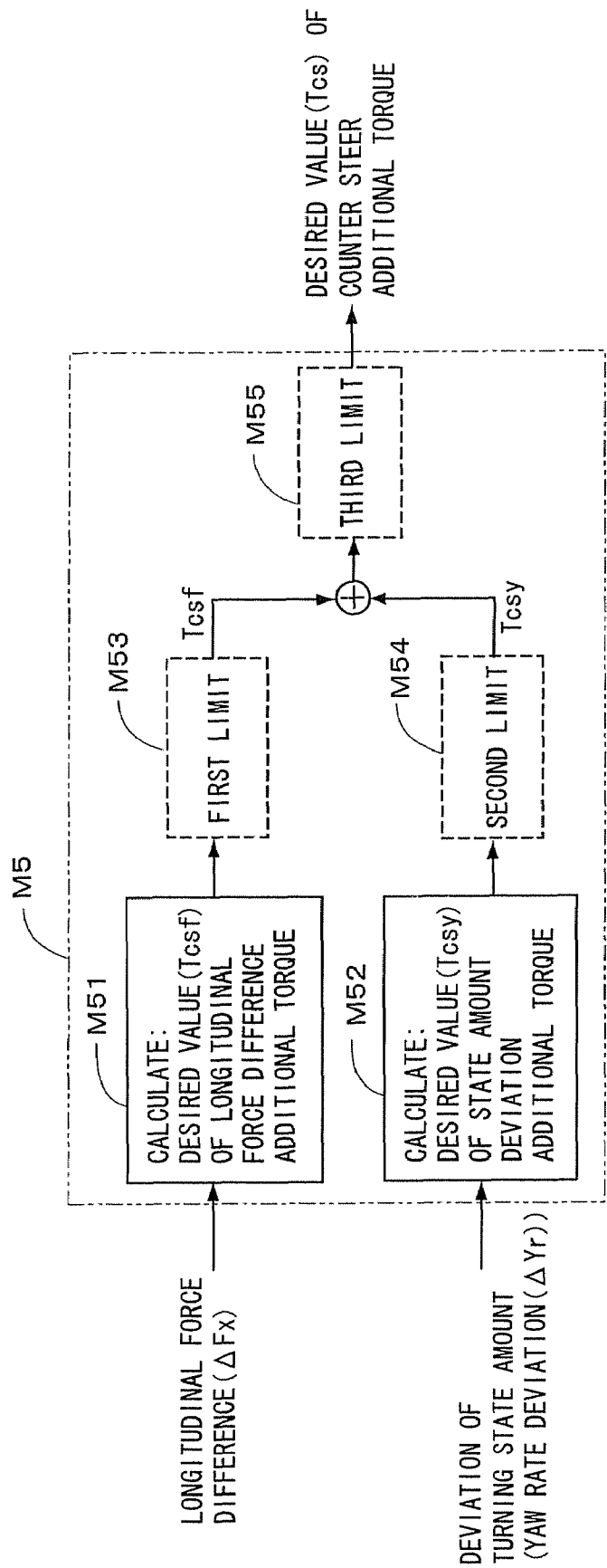
FIG. 6 is a block diagram of an example of a desired counter steer additional torque determination device, according to an embodiment of the present invention.
Figure 7:
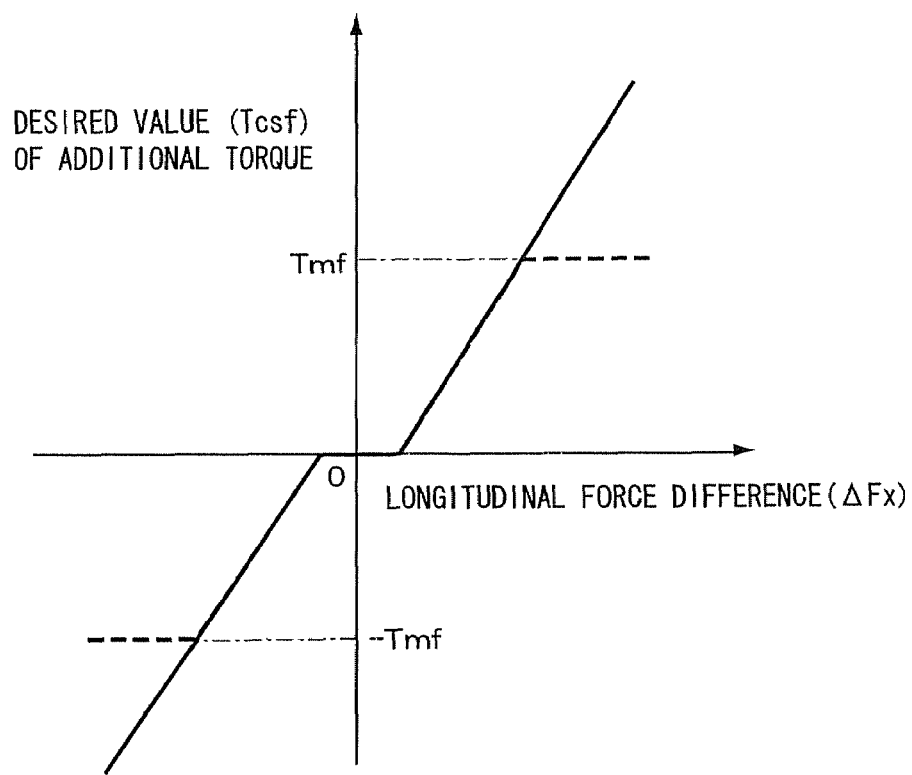
FIG. 7 is a diagram showing an example of a map for determining a desired value of longitudinal force difference additional torque, according to an embodiment of the present invention.
Figure 8:
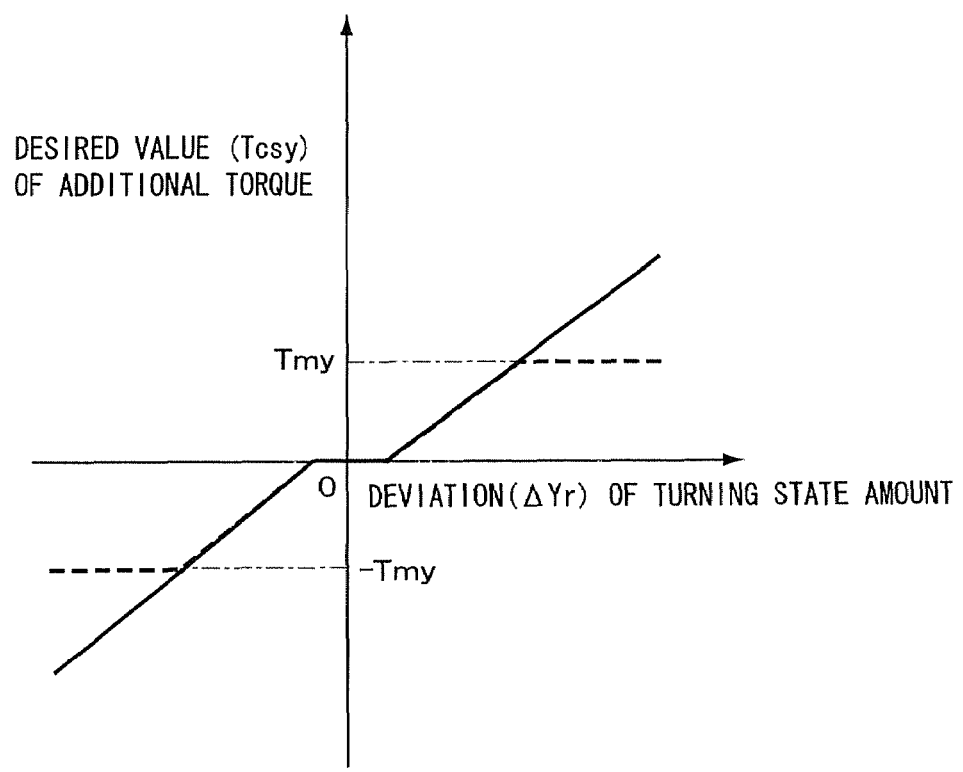
FIG. 8 is a diagram showing an example of a map for determining a desired value of state amount deviation additional torque, according to an embodiment of the present invention.

Next will be explained calculation of the desired value (Tcs) of counter steer additional torque made by the desired counter steer additional torque determination device M5, with reference to FIG. 6. The longitudinal force difference ($\Delta$FX) calculated by the longitudinal force difference calculation device M4 and the turning state amount deviation (yaw rate deviation $\Delta$Yr) calculated by the deviation calculation device M9, are fed into the desired counter steer additional torque determination device M5. According to a longitudinal force difference additional torque determination device M51 as shown in FIG. 6, a desired value (Tcsf) of longitudinal force difference additional torque is calculated on the basis of the longitudinal force difference ($\Delta$FX), in accordance with a predetermined characteristic as shown in FIG. 7. Also, according to the deviation difference additional torque determination device M52, a desired value (Tcsy) of state amount deviation additional torque is calculated on the basis of the turning state amount deviation (yaw rate deviation ($\Delta$Yr)), in accordance with a predetermined characteristic as shown in FIG. 8. And, the desired value (Tcsf) of longitudinal force difference additional torque is added to the desired value (Tcsy) of state amount deviation additional torque, to output the desired value (Tcs) of counter steer additional torque. When the desired value (Tcsf) of longitudinal force difference additional torque is calculated, limits (Tmf) and (-Tmf) as indicated by a broken line in FIG. 7 may be provided by a first limit setting device M53 as indicated by a broken line in FIG. 6. Likewise, when the desired value (Tcsy) of state amount deviation additional torque is calculated, limits (Tmy) and (-Tmy) as indicated by a broken line in FIG. 8 may be provided by a second limit setting device M54 as indicated by a broken line in FIG. 6.

Instead of the yaw rate (Yr) served as the turning state amount in the above embodiment, the lateral acceleration (Gy) may be used. In the case where the lateral acceleration (Gy) is used as the turning state amount, the "yaw rate" may be replaced by the "lateral acceleration", in the description with reference to FIGS. 4-8. In the case where the lateral acceleration (Gy) is used as the turning state amount at the reference radius setting device M81 as shown in FIG. 5, therefore, if the lateral acceleration obtained when the control flag (Flg) has become to provide the ON state, or immediately before that time, is set to be "Gyo", the reference radius (Ro) can be calculated by Ro=Vxo$^2$/Gyo at the desired state amount calculation device M82.

According to the calculation of the desired value (Tcsy) of state amount deviation additional torque as described above, the turning radius of the vehicle is obtained, with the start of μ-split control for the anti-skid control or traction control being used as the reference. And, the state amount deviation is to be calculated, provided that the turning radius will not be changed. In the case where the steering wheel is required to be maneuvered, during the μ-split control, the state amount deviation would cause an error in the control. In this case, therefore, in order to easily override the desired value (Tcsy) of state amount deviation additional torque, it may be provided with such a relationship as limit (Tmf)>limit (Tmy), which is a relationship in magnitude of their absolute values.

Furthermore, although the counter steer assist control is provided for inducing the vehicle driver to perform the counter steer, there may be a case where the vehicle driver would not require it. In that case, a third limit may be set by a third limit setting device M55 to the added result of the desired value (Tcsf) of longitudinal force difference additional torque and the desired value (Tcsy) of state amount deviation additional torque. By means of the third limit, the vehicle driver can override the counter steer assist control easily.

It should be apparent to one skilled in the art that the above-described embodiment are merely illustrative of but a few of the many possible specific embodiments of the present invention. Numerous and various other arrangements can be readily devised by those skilled in the art without departing from the spirit and scope of the invention as defined in the following claims.

What is claimed is:

1. A steering control apparatus for a vehicle having steering means for controlling steering torque applied to a steering wheel of said vehicle, braking means for controlling longitudinal force applied to each wheel of said vehicle, individually, and control means for performing at least one of an anti-skid control and a traction control by said braking means, comprising:

longitudinal force difference calculation means for calculating a difference of the longitudinal force applied to right and left wheels of said vehicle in the lateral direction thereof;

turning state amount detection means for detecting a turning state amount of said vehicle;

desired state amount calculation means for calculating a desired amount of turning state of said vehicle; and deviation calculation means for calculating a turning state amount deviation between the turning state amount detected by said turning state amount detection means and the desired amount of turning state calculated by said desired state amount calculation means, wherein said steering means controls the steering torque on the basis of the difference of the longitudinal force calculated by said longitudinal force difference calculation means, and the turning state amount deviation calculated by said deviation calculation means, and wherein said desired state amount calculation means observes whether said control means is performing the control on a split road surface with different coefficients of friction being provided at the right and left side of said vehicle, and wherein said desired state amount calculation means calculates the desired amount of turning state, on the basis of the turning state of said vehicle obtained when one of the anti-skid control and the traction control is performed on the split road surface.

2. A steering control apparatus as set forth in claim 1, further comprising:

first desired value calculation means for calculating a first desired value for said steering torque on the basis of the difference of the longitudinal force calculated by said longitudinal force difference calculation means; and second desired value calculation means for calculating a second desired value for said steering torque on the basis of the turning state amount deviation calculated by said deviation calculation means, wherein said steering means controls the steering torque on the basis of the first desired value and the second desired value.

3. A steering control apparatus as set forth in claim 2, wherein said first desired value calculation means provides a first limit for the first desired value, and said second desired value calculation means provides a second limit for the second desired value.

4. A steering control apparatus as set forth in claim 3, wherein the second limit is set to be smaller than the first limit.

5. A steering control apparatus as set forth in claim 2, wherein the first desired value and the second desired value are added to provide a sum thereof, and wherein said steering means controls the steering torque on the basis of the sum of the first desired value and the second desired value.

6. A steering control apparatus as set forth in claim 5, wherein a third limit is provided for the sum of the first desired value and the second desired value.

7. A steering control apparatus as set forth in claim 1, wherein said turning state amount detection means includes a yaw rate sensor for detecting a yaw rate of said vehicle, the yaw rate being served as the turning state amount of said vehicle.

8. A steering control apparatus as set forth in claim 1, wherein said turning state amount detection means includes a lateral acceleration sensor for detecting a lateral acceleration of said vehicle, the lateral acceleration being served as the turning state amount of said vehicle.

* * * * *